Mar. 20, 1923.

H. H. HUNTINGTON ET AL.
METHOD OF MAKING SPROCKET WHEELS.
FILED AUG. 20, 1919.

1,448,803.

Inventors
Hiram H. Huntington
and Edward H. Cureton
By Staley & Bowman
Attorneys Patented Mar. 20, 1923.

1,448,803

UNITED STATES PATENT OFFICE.

HIRAM H. HUNTINGTON AND EDWARD H. CURETON, OF RICHMOND, INDIANA, ASSIGNORS TO THE AMERICAN SEEDING MACHINE COMPANY, OF SPRINGFIELD, OHIO, A CORPORATION OF OHIO.

METHOD OF MAKING SPROCKET WHEELS.

Application filed August 20, 1919. Serial No. 318,630.

*To all whom it may concern:*

Be it known that we, HIRAM H. HUNTINGTON and EDWARD H. CURETON, citizens of the United States, residing at Richmond, in the county of Wayne and State of Indiana, have invented certain new and useful Improvements in Methods of Making Sprocket Wheels, of which the following is a specification.

This invention relates to improvements in sprocket wheels and the method of constructing same, and more particularly to a sprocket wheel in which the teeth are punched from a metallic band which is afterwards rolled in the form of a hoop to form the wheel.

The principal object of the invention is to provide a form of tooth which may be readily punched on the metallic band and at the same time be of a form to provide for an effective engagement with the links of the chain and of sufficient strength to withstand the strain.

In the accompanying drawings:—

The toothed rim embodying the improvements is one especially intended to be attached to the wheel of a farm wagon for the purpose of transmitting motion to the seeding devices of an end-gate seeder. Heretofore, it has been usual to employ cast iron sprocket wheels for the purpose, but the breakage of these cast iron wheels resulting principally from shipping has been a serious drawback, and in order to overcome this objection we have devised a wheel constructed in the following manner.

Figure 3:
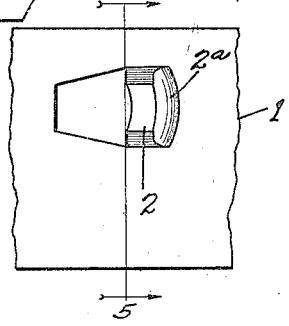
Fig. 3 is an enlarged plan view of a portion of a sprocket tooth.
Figure 4:
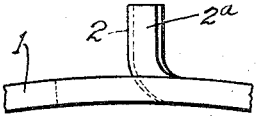
Fig. 4 is an enlarged side view of a portion of a sprocket tooth.
Figure 5:
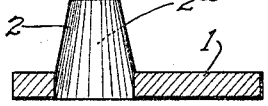
Fig. 5 is an enlarged section on the line 5—5 of Fig. 3.

Referring to the drawings, 1 represents a steel band having sufficient flexibility to enable it to be rolled in the form of a hoop. When in a flat condition the band is punched to provide a series of radially extending teeth 2, equally spaced throughout the length of the band. The teeth are cut or punched from the band longitudinally of its length of a tapering form so that the top of each tooth will be narrower than its base, as indicated in Fig. 3, and the teeth are bent back at right-angles so that they will extend in a radial direction when the band is rolled to a circular form. The width of the cut for each tooth is such that the width of the tooth will be considerably greater than its thickness, represented by the thickness of the band. The forward face of each tooth, or that face which engages the links of the sprocket chain, is of slightly convex form, as shown best in Figs. 3 and 5 and indicated by $2^a$, so as to present a rounded surface to the links of the chain and thereby reduce the wear between the parts.

Figure 1:
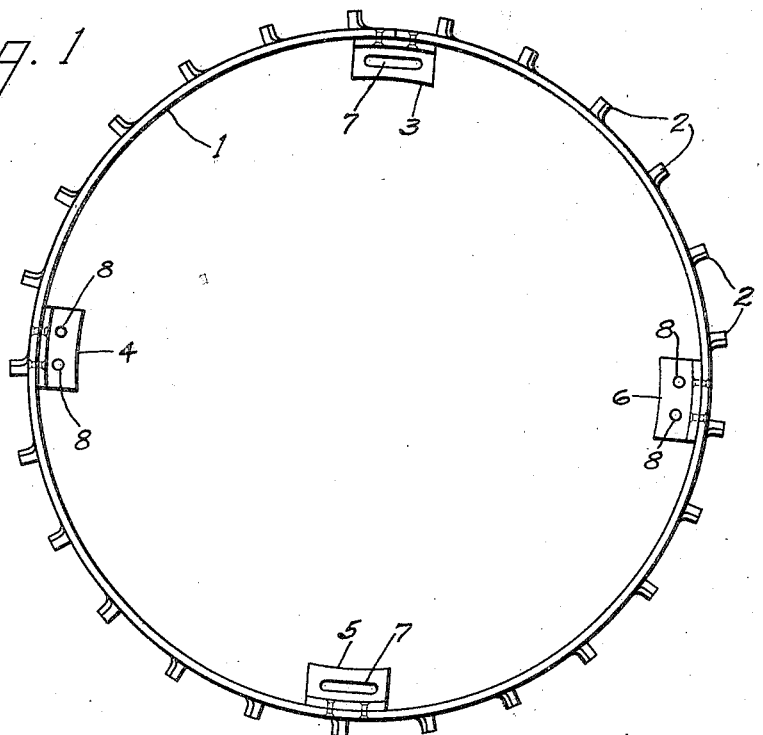
Fig. 1 is a side elevation of a construction embodying the improvements.
Figure 2:
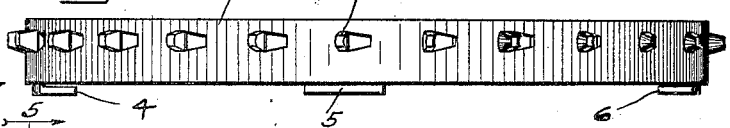
Fig. 2 is a plan view of the same.

As shown in Fig. 1 the ends of the band after being rolled into the form of a hoop are secured together by an angle iron bracket 3, one wing of which is riveted to the inner periphery of each end of the band. Additional brackets 4, 5 and 6 of similar form are likewise secured at equal distances about the inner periphery of the rim. The brackets 3 and 5 are provided with slotted openings 7, while the brackets 4 and 6 have round openings 8 and these openings are designed to receive fastening devices to be placed about the spokes of the wheel to which the sprocket rim is intended to be attached for the purpose of securing the rim in position on the wheel. The slotted openings 7 are longer than the width of the clips 9 so that the clips may be brought in registry with the spokes of the wagon wheel.

By the method described, it will be seen that a very simple, strong and efficient sprocket wheel is formed which may be readily applied to the spokes of a wagon wheel or similar support, and in which all danger of breakage by shipping or ordinary use is eliminated; also one in which the teeth will be effective for their purpose, being so formed as to present wide, rounded faces to the chain and being of sufficient strength to resist all driving stresses as well as occupying the proper radial position.

While we have shown and described the rim formed from a flat band or bar, which is the preferable form, we do not wish to be confined to this particular shape, as good results may be obtained with bands or bars of angle, channel, oval, half-oval or other shapes.

Having thus described our invention, we claim:—

1. The method of constructing a sprocket wheel consisting in first punching teeth from a metal band in a direction longitudinally of its length, bending said teeth at right angles to said band, forming each tooth with a convex face, then rolling the band in the form of a hoop, and securing the ends thereof together.

2. The method of constructing a sprocket wheel consisting in first punching teeth from a metal band in a direction longitudinally of its length so that the width of each tooth will be greater than its thickness, bending said teeth at right angles to said band, shaping said teeth, then rolling the band in the form of a hoop, and securing the ends thereof together.

In testimony whereof, we have hereunto set our hands this 14th day of August, 1919.

HIRAM H. $\times$ HUNTINGTON.
his mark

EDWARD H. CURETON.

Witnesses:
GEORGE M. KRIEGBAUM,
ELMER E. TOWLE.